United States Patent [19]

Sharp

[11] 4,442,566
[45] Apr. 17, 1984

[54] WINDSHIELD WIPER BLADE REFILL UNIT

[75] Inventor: Bernard C. Sharp, White Plains, N.Y.

[73] Assignee: Parker-Hannifin Corporation, Shelton, Conn.

[21] Appl. No.: 318,840

[22] Filed: Nov. 6, 1981

[51] Int. Cl.³ .............................. B60S 1/02; B60S 1/38
[52] U.S. Cl. ................................................. 15/250.42
[58] Field of Search ......................... 15/250.32–250.42

[56] References Cited

U.S. PATENT DOCUMENTS

| | | | |
|---|---|---|---|
| 3,153,254 | 10/1964 | Lenz et al. | 15/250.42 |
| 3,408,680 | 11/1968 | Heller | 15/250.42 |
| 3,626,544 | 12/1971 | Lopez et al. | 15/250.42 |
| 3,659,310 | 5/1972 | Rosen | 15/250.42 |
| 3,769,653 | 11/1973 | Lopez et al. | 15/250.42 |
| 3,885,265 | 5/1975 | Deibel et al. | 15/250.42 |
| 3,919,736 | 11/1975 | Bourassa et al. | 15/250.42 |
| 3,928,887 | 12/1975 | Lopez et al. | 15/250.42 X |
| 3,940,823 | 3/1976 | Rosenbeck | 15/250.42 |
| 4,156,951 | 6/1979 | Sharp | 15/250.42 |
| 4,271,558 | 6/1981 | D'Alba | 15/250.42 |

FOREIGN PATENT DOCUMENTS 2036547 7/1980 United Kingdom ............. 15/250.42

*Primary Examiner*—Peter Feldman
*Attorney, Agent, or Firm*—Albert C. Johnston

[57] ABSTRACT

A windshield wiper blade refill unit including an elongate elastic wiping blade having an elongate spline, or backing strip, affixed to it to be received slidably and held detachably in the claws of a pressure-applying wiper blade holder is provided with structures which enable the same refill unit to be used in any one of a plurality of wiper blade holders that have different lengths. The spline is formed with an end portion that extends beyond the working position thereon of an endmost set of the claws of the longest of the blade holders, and this end portion is formed at a plurality of spaced locations with detent means each of which is interengageable with a complimentary clip means for attaching the spline to a blade holder having one of the several lengths.

10 Claims, 8 Drawing Figures

U.S. Patent   Apr. 17, 1984   4,442,566
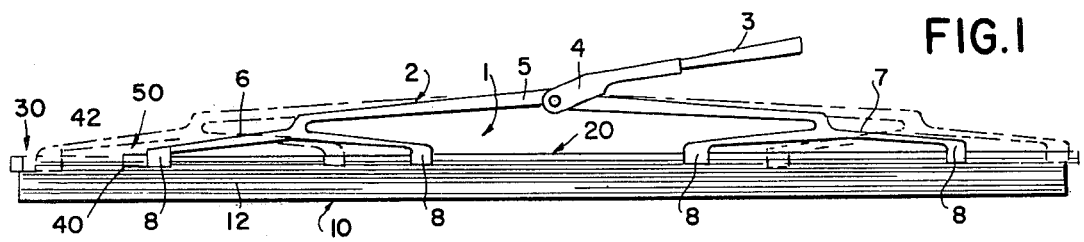
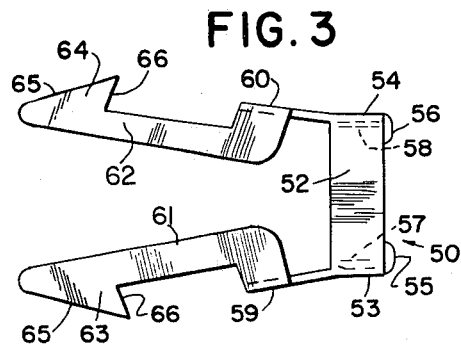
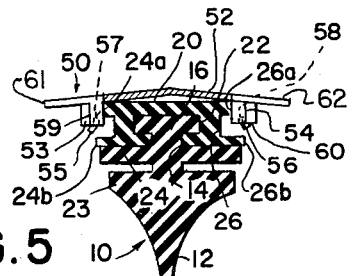
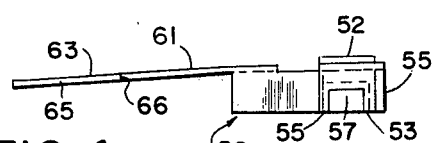
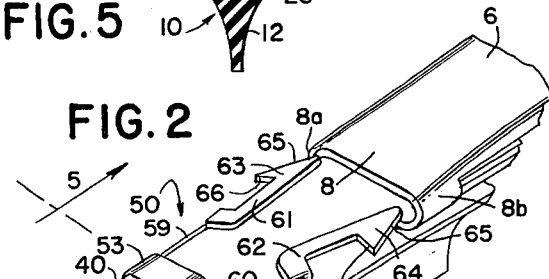
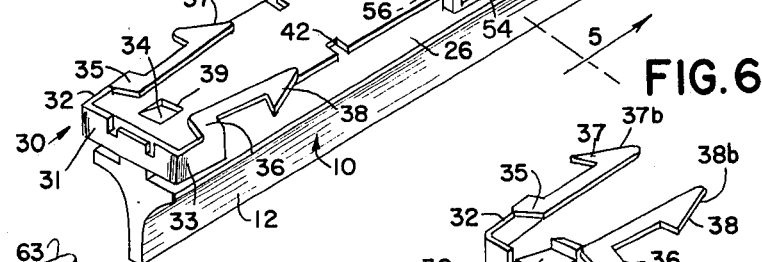
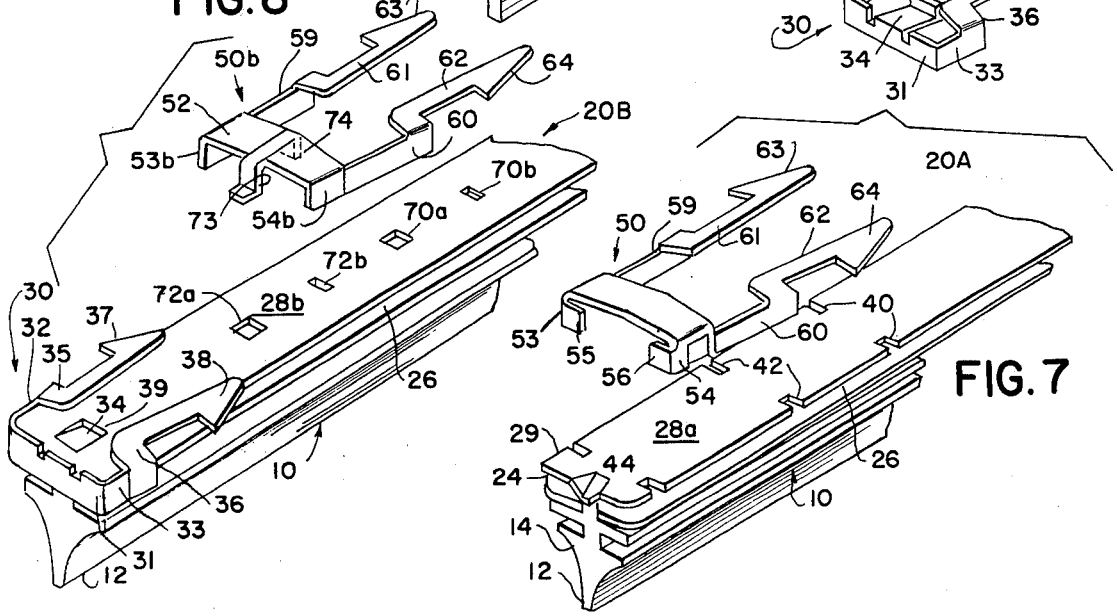

WINDSHIELD WIPER BLADE REFILL UNIT

This invention relates to windshield wipers and, more particularly, to a wiper blade refill unit for replacing the wiping blade in any one of a plurality of pressure-applying wiper blade holders, or super-structures, that have different working lengths.

Windshield wipers for curved automobile windshields generally comprise a replaceable blade unit held slidably in a pressure-applying blade holder, often called a super-structure, which comprises bowed yoke portions having sets of claws at their ends. The blade unit includes an elastic wiping blade, usually made of rubber, supported by a spline, or backing strip, that is flexible in the direction perpendicular to the windshield surface under pressure applied through the blade holder from a wiper arm. Lateral portions of the spline are engaged slidably in the claws of the blade holder, and a fastening device such as a resilient clip attached to the spline engages with a set of claws on the holder to keep the blade unit from sliding out of the claws in use.

Wiper blade refills which serve for replacement of the blade units of various forms of windshield wipers are disclosed, for example, in U.S. Pat. Nos. 3,626,544, 3,707,741, 3,769,653, 3,885,265, 3,919,736 and 3,940,823. Also, refills have been provided, for example as described in U.S. Pat. Nos. 3,408,680 and 3,919,736, in which the splines, or blade backing strips, are formed as a laterally channeled strip of extruded resilient plastic material.

Several of the above noted patents, and others including U.S. Pat. Nos. 2,983,945 and 3,153,254, disclose resilient fastening clips formed to be mounted on an end of the spline of a wiper blade unit and to engage detachably with an endmost set of the claws of a blade holder for keeping the blade unit in place in the holder. Fastening clips especially suited for longitudinally hollow, laterally channeled splines of extruded plastic material are disclosed in U.S. Pat. Nos. 3,919,736 and 4,156,951.

The pressure-applying blade holders of conventional windshield wipers usually have had a length, i.e., the distance spanned between their respective endmost sets of claws, corresponding approximately to the length of the blade unit, or refill, to be used in the holder. Some commercial forms of automobile windshield wipers, however, are provided with blade holders considerably shorter than the blade units to be used in them. Refills fitted with attaching clips on an end thereof will not fit properly in these relatively "short" blade holders.

A wiper blade refill arrangement employing a system of adapter clips with an especially formed spline for accommodating a refill unit to blade holders having different lengths is disclosed in U.S. Pat. No. 4,271,558. That system is objectionably complex to use and costly to produce.

The principal object of the present invention is to provide a wiper blade refill unit of relatively simple construction which is especially suited for use in pressure-applying blade holders having any one of several different lengths.

The wiper blade refill unit herein set forth is similar to well known refills in that it makes use of a transversely flexible spline, or backing strip, affixed to an elastic wiping blade for supporting the blade in wiping position in the claws of a pressure-applying blade holder. In the present refill unit, however, unlike the known refills, the spline is slidable into and supportable substantially symmetrically by the claws of any one of a plurality of blade holders which respectively have different lengths, so will span different lengths of a blade unit between their respective endmost sets of claws; and an end portion of the spline that extends beyond the position relative thereto of an endmost set of the claws of the longest of the blade holders is formed at each of a plurality of locations spaced apart thereon, each of which is suited to a certain one of the blade holder lengths, with cut-away rigid detent means that are interengageable with a detent of a clip means for attaching the spline to an endmost set of the claws of a blade holder having the related length. As a result, by simply engaging a fitting attaching means with the detent means at a suitably selected location, the refill unit can be easily installed for proper operation and use in a pressure-applying blade holder having any one of the several lengths that occur in commercial windshield wipers suited for a prescribed wiping blade length.

According to one form of embodiment of the invention, the detent means at each of a plurality of locations spaced apart on the spline end portion comprises a pair of oppositely disposed notches formed in the opposite side edges of the spline. A refill unit of this form conveniently includes as the means for attaching it to blade holder claws a resilient clip especially formed to be placed and to hold itself onto the spline at any selected one of the locations where a pair of the notches is provided in the spline edges.

According to another form of embodiment, each of the detent means comprises a pair of apertures formed in and spaced apart longitudinally of a central portion of the spline end portion; and a refill unit of this form conveniently comprises another especially formed resilient clip that can be placed and will hold itself onto the spline at any selected one of the locations where a pair of the apertures is formed in the spline.

According to further forms of embodiment of the invention, which are applicable particularly for a spline formed as disclosed, e.g., in U.S. Pat. No. 4,156,951, the detent means at an end location suited for the longest of the blade holders may be an indentation formed in a central portion of the spline and the detent means at each of at least two other locations spaced apart along the spline end portion may comprise a pair of oppositely disposed notches as mentioned above or a pair of apertures as mentioned above. A refill unit of this form may be pre-fitted at the end location with an attaching means interengaged with the indentation, which preferably, for instance, is a resilient clip of the form disclosed in said U.S. Pat. No. 4,156,951. Such a refill unit is also provided with a second attachable resilient clip especially formed to be applied to a selected one of the pairs of spline edge notches, or of spline apertures, when the unit is to be installed for use in a relatively short blade holder.

The above mentioned and other objects, features and advantages of the invention will be further evident from the accompanying drawings and the following detailed description of illustrative embodiments of the invention. In the drawings:

FIG. 1 is a side elevational view of a wiper blade refill unit according to the invention, as assembled for use in the claws of the shortest of several blade holders for which the refill unit is suited, a longest of such blade holders being indicated by broken lines;

FIG. 2 is a perspective view of an end portion of the refill unit in process of being assembled with the relatively short blade holder;

FIG. 3 is a plan view of a resilient clip provided for the refill unit;

FIG. 4 is a side elevational view of the same clip;

FIG. 5 is a cross-sectional view taken along line 5—5 of FIG. 2, showing the clip of FIG. 3 in working position as seen from its backward end and partly in section;

FIG. 6 is a perspective view of a second resilient clip provided at the end of the refill unit of FIGS. 1 and 2;

FIG. 7 is an exploded, perspective view of an end portion of an alternative form of the refill unit and a resilient clip for attaching this unit to a relatively shorter blade holder; and FIG. 8 is an exploded, perspective view of a modified form of the refill unit of FIGS. 1 and 2, by which a single resilient clip such as that of FIG. 3 serves for attaching the unit in proper position on any one of the several blade holders having different lengths.

The windshield wiper assembly shown in FIG. 1 comprises a replaceable wiper blade unit, or refill, 1 fitted onto a pressure-applying blade holder, or superstructure, 2 which may have any of various forms used for automobile windshield wipers. The blade holder 2 is mounted on the end of a windshield wiper arm 3 through a coupler 4 pivoted to a central portion of a primary yoke, or bow member, 5 of the holder. The ends of this primary yoke are connected pivotably with the midportions of secondary yokes, or bow members, 6 and 7 each of which carries sets of claws 8 at its opposite ends for sliding engagement with the spline, or backing strip, of the blade refill unit.

The blade refill unit 1 consists essentially of an elastic wiping blade 10 of rubber or rubber-like material and a transversely flexible spline, or backing strip, 20 affixed to and along the back or upper edge portion of blade 10. Various known forms of elastic wiping blades and affixed backing strips, or splines, may be adapted for use according to the present invention. In the form shown, the blade 10 is a length of an elastic rubber extrusion having a substantially V-shaped wiping portion 12 for engagement with a windshield, which portion is connected through a narrow neck portion 14 with a bulbous head portion 16 for connection with the spline 20.

The spline 20, as shown, is a length, a little longer than blade 10, of an extrusion of a stiff resilient material, preferably of a thermoplastic resin such as a black polycarbonate resin impregnated with carbon black. This spline is formed with a central hollow, or cavity, 22 extending longitudinally from end to end thereof, with a slot 23 along the bottom of the hollow and with laterally open channels 24 and 26 which are bounded, respectively, by upper and lower flanges 24a, 24b and 26a, 26b extending along the opposite sides of the spline. The hollow 22 and slot 23 receive slidably through either end thereof the head and neck portions 14 and 16, respective of the blade 10. The channels 24 and 26 are formed to receive slidably the inwardly directed ends of the claws 8a and 8b of each set 8 of claws on the blade holder, as indicated in respect of an endmost claw set 8A in FIG. 2. In the embodiment shown in FIGS. 1 and 2, the refill unit 1 is fitted at one end of its spline 20 with a resilient clip 30 for attaching the unit to an endmost set of the claws of a blade holder that has the longest of the several lengths of the blade holders for which the unit is suited, such for instance as the blade holder shown in broken lines in FIG. 1. The clip 30 may be of the form disclosed in U.S. Pat. No. 4,156,951, the disclosure of which is incorporated herein by reference.

The clip 30 has a base portion 31 formed to lie across an end of spline 20, with wing portions 32 and 33 bent forwardly and slightly outwardly from the opposite ends of base portion 31 so as to overlie and, normally, slope away from end portions of the spline flanges that border the channels 24 and 26. A footing portion 34 formed as a tongue having an upturned lip 35 extends forwardly from an upper central region of the base portion 31 so as to fit into an end of the central hollow 22 in the spline and to be engaged therein with a suitable detent means formed on the spline, such, for example, as an indentation 39 struck down from the top surface of spline 20 into the hollow 22 so that the end of the indentation or tab 39 will engage against the upturned lip 35 to hold the clip 30 in place.

The wing portions 32 and 33 of clip 30 have substantially flat legs 35 and 36 extending inwardly from their upper edges and then forwardly so as to lie upon and along the upper surface of the spline. These legs have at their ends outwardly protruding latch portions 37 and 38, respectively, and they normally are divergent, as indicated in FIG. 2, so that the latch portions 37 and 38 normally extend laterally from the spline channels for engagement with an endmost set of blade holder claws. Sloped forward edge surfaces 37b and 38b of the latch portions will engage with the claws of an endmost set 8 on the longest of the blade holders and, by a wedging action, will converge the legs 35 and 36 for engagement of the latch portions inwardly of those claws upon being slid inside them with the spline at the end of sliding movement of the refill unit onto the claws of the blade holder. The outward slope and resilience of the wing portions 32 and 33 enable these wing portions to be engaged between a person's fingers and to be converged elastically by finger pressure so as to displace the latch portions 37 and 38 inwardly of the engaged claws, and thus to disengage the clip 30 for removal of the refill unit from the claws of the blade holder whenever desired.

The blade refill unit 1 is made adaptable for use in relatively shorter blade holders, which respectively span different lengths of the unit between their respective endmost sets of claws, by providing an end portion of the spline 20, at each of a plurality of locations spaced apart thereon so as to be suited to the respective span lengths of the blade holders, with cut-away detent means that are interengageable with a complementary means, such as a second resilient clip, for attaching the spline to an endmost set of the claws of any one of such blade holders As shown in FIG. 2, at a location suited for the shortest of the several blade holder lengths, such detent means is provided as a pair of oppositely disposed notches 40 formed in the opposite side edges of the spline 20 along its upper channel flanges 24a and 26a. Similarly, at a location suited for a blade holder of an intermediate length, a pair of oppositely disposed notches 42 is formed in the opposite side edges of the spline.

For attaching the refill unit to any one of the relatively shorter blade holders, a second resilient clip 50 is provided which is formed to be placed and to hold itself onto the spline 20 at a selected location corresponding to the location of one of the pairs of notches 40 or 42. The clip 50, as shown in FIGS, 2–5, comprises a base 52 formed to overlie the spline 20 and having depending opposite side walls 53 and 54 which straddle the spline. These side walls have detents 55 and 56 turned laterally inward from them to engage in the selected pair of notches 40 or 42, and have along their inner sides inward protrusions 57 and 58, respectively, which are formed to engage under opposite side edges of the spline, beneath and along the edges of its upper flanges 24a and 26a, and thus to keep the clip 50 in place when it is pushed down onto the spline. Normally divergent resilient wing portions 59 and 60 extend forwardly from the side walls 53 and 54 along the opposite side edges of the spline, and substantially flat legs 61 and 62 extend from these wing portions so as to lie upon and along the spline. The legs 61 and 62 have at their forward ends latch portions 63 and 64, each of which is formed with a backwardly and outwardly sloped forward surface 65 that leads to a lateral abutment surface 66 for latching engagement with a claw 8a or 8b of an endmost claw set 8A on a secondary yoke 6 of a relatively short blade holder 2.

When the clip 50 is in place, the latch portion 63 and 64 protrude laterally from the spline 20 and are engageable detachably with the claws 8a and 8b by being slid inside the same with the spline. The sloped surfaces 65 when slid against the claws cause the legs 61 and 62 to converge against the resilience of wing portions 59 and 60 until the latch portions reach a position at the inward side of the claws, whereupon the resilience of the wing portions returns the latch portions to their normal, laterally protruding position with the claws 8a and 8b latched in the leg recesses backward of the abutment surfaces 66.

Whenever it is desired to remove the refill unit 1 from the relatively short blade holder 2, the latch portions 63 and 64 of clip 50 can be displaced inward by finger pressure on the wing portions 59 and 60, which frees the clip for backward sliding movement with the spline 20 through and away from the endmost set of claws 8a and 8b. On the other hand, when the clip is engaged with these claws the blade refill unit is held securely in its proper, substantially symmetrical working position relative to the blade holder due to the positioning of the refill unit by the clip engaged in the notches 40 and the confinement of the claws 8a and 8b in the clip arm recesses behind the latch portions 63 and 64. When pressed into a selected location of notches in the spline 20, the clip 50 is held in place by its inturned detents 55 and 56 engaged in the notches and by the engagement of the inward protrusions 57 and 58 of the clip side walls under the opposite side edges of the spline.

In the event of need to use the refill unit in a blade holder having a length intermediate the lengths of the longest and shortest blade holders for which the unit is suited, the clip 50 can be placed and will hold itself onto the spline 20 at the location of the notches 42, in the same way as described above with reference to the notches 40. The resilience of the clip 50 and its manner of interengagement with the spline permit it to be removed from placement at one of the notch locations for replacement at another of them, if and whenever desired, simply by pushing a wing portion 59 or 60 upward relative to the spline by finger pressure to disengage the adjacent inward protrusion 57 or 58 from the spline edges.

In the modification shown in FIG. 7, the fastenable end portion 28A of the spline 20A comprises pairs of notches 40 and 42 as in the embodiment of FIG. 2, but at its end 29, instead of being fitted with an end clip 30, it is formed with a third pair of notches 44 for attachment of the clip 50 at a location suited for installing the refill unit in the longest of the several blade holders. A single clip 50 thus will serve for holding the refill unit in the required substantially symmetrically working position in a blade holder having any of the several lengths for which the refill unit is suited. With the clip 50 detached, a refill unit according to FIG. 7 can be slid from either end of its spline 20A into the claws of any one of the blade holders, and the pair of notches 40, 42, or 44 to be used for attaching the refill unit in working position will be seen outside an endmost set of the claws upon moving the refill unit to a substantially symmetrical position relative to the claws of the blade holder. The spline end portion 28A may then be slid somewhat further out of the endmost claw set and the clip 50 pressed down onto it at the identified notch location, and then the spline end 29 may be slid back toward the claws to engage the clip 50 with the endmost set of claws.

FIG. 8 shows an end portion of a blade refill unit similar to that of FIGS. 1 and 2 but differing from the latter in that the attachable end portion 28B of the spline 20B is formed at each of two or more locations spaced apart thereon, each of which is suited to a certain one of the several blade holder lengths, with detent means in the form of a pair of apertures 70a and 70b, or 72a and 72b, which are interengageable with a complementary resilient clip 50B for attaching the spline 20B to an endmost set of the claws of a blade holder having the length for which the pair of apertures is located. The apertures of each pair are formed in and spaced apart longitudinally of a central portion of the spline 20B. The clip 50B is similar to the clip 50 of FIGS. 2–7, excepting that the depending side walls 53B and 54B of its base 52B need not be provided with inturned detents or with inward protrusions to engage under the spline edges, and instead the base 52B has detents such as an angled backward tongue 73 and a depending forward tongue 74 turned downward from it for engagement in a pair of the apertures 72a, 72b or 70a, 70b.

The clip 50B is engaged with the spline of the refill unit simply by holding it tilted upward in one's fingers and pushing the angled tongue 73 downward into the backward aperture 72a or 70a of the selected pair of apertures and then turning the clip downward to insert the forward tongue 74 into the forward aperture 72b or 70b of the pair. The tongues 73 and 74 thus engaged in the apertures prevent movement of the clip 50B relative to the spline 20B in the longitudinal direction of the spline, while the backwardly angled tongue 73 engaged against an under surface of the spline holds the clip to the spline when the latch portions 63 and 64 of the legs 61 and 62 are engaged with an endmost set of blade holder claws as described above with reference to clip 50.

The embodiment shown in FIG. 8 makes use of an end clip 30 assembled to the end of spline end portion 28B as in the embodiment of FIG. 2, for attaching the refill unit to the longest of the several blade holders. It will be apparent, however, that a single clip such as clip 50B may be employed, with omission of the use of clip 30, by providing the spline end portion 28B with a third pair of apertures to receive clip 50B at a location adjacent to the end of the spline. It will also be apparent that other variations in the forms of the detent means and forms of the clip or clips to be employed according to the present invention may be made while still utilizing the new features of the invention, which are intended to be defined by the appended claims.

I claim:

1. A windshield wiper blade refill unit for use in any one of a plurality of pressure-applying wiper blade holders each of which comprises sets of claws spaced apart therealong for slidably receiving and holding a wiper blade unit and which respectively have different lengths to span different lengths of a blade unit between their respective endmost sets of claws, said refill unit including an elastic wiper blade and an elongate resilient spline affixed to said blade for supporting it in wiping position, said spline being slidable into and supportable by the claws of any one of said holders and having an end portion that extends beyond the position relative thereto of an endmost set of claws of the longest of said blade holders when the refill unit is in wiping position thereon, said spline end portion being formed at each of a plurality of locations spaced apart therealong, each of which is suited to a certain one of said holder lengths, with cut-away rigid detent means interengageable with a detent of a clip means for attaching said spline to an endmost set of the claws of a blade holder having that length.

2. A blade refill unit according to claim 1, said detent means at each of a plurality of said locations comprising a pair of oppositely disposed notches formed in the opposite side edges of said spline.

3. A blade refill unit according to claim 1, said spline end portion being formed with a said detent means at each of at least three of said locations of which one is adjacent to the end of said spline end portion, said detent means at each of said locations comprising a pair of oppositely disposed notches formed in opposite side edges of said spline.

4. A blade refill unit according to claim 1, said spline end portion being formed with a said detent means at each of at least three said locations of which one is adjacent to the end of said spline end portion, said detent means at said one location comprising an indentation in a central portion of said spline and said detent means at each other of said locations comprising a pair of oppositely disposed notches formed in the opposite side edges of said spline.

5. A blade refill unit according to claim 2, 3, or 4, including as a said attaching clip means a resilient clip formed to be placed and to hold itself onto said spline at any selected one of a plurality of said locations, said clip comprising a base to overlie and having depending opposite side walls to straddle said spline, detents turned inward from said side walls to engage in a pair of said notches, protrusions on the inner sides of said side walls to engage under opposite side edges of said spline, normally divergent resilient wing portions extending from said side walls to lie along said side edges, and substantially flat legs extending from said wing portions to lie upon and along said spline and having near their ends latch portions that, when the clip is in place, protrude laterally from the spline and are engageable detachably with the claws of a said endmost set by being slid inside the same with said spline.

6. A blade refill unit according to claim 4, including as said attaching clip means at said one location a first resilient clip having a base portion lying across the end of said spline end portion, said base portion having a footing portion interengaged with said indentation and having normally divergent resilient wing portions extending from its opposite ends along said spline edges, and substantially flat legs extending from said wing portions and lying upon and along said spline and having near their ends latch portions engageable detachably with an endmost set of the claws of the longest of said blade holders by being slid inside the same with said spline; said refill unit further including, as said attaching clip means for any selected one of said other locations, a second resilient clip formed to be placed and to hold itself onto said spline at the selected location, said second clip comprising a base to overlie and having depending opposite side walls to straddle said spline, detents turned inward from said side walls to engage in a pair of said notches, protrusions on the inner sides of said side walls to engage under opposite side edges of said spline, normally divergent resilient wing portions extending from said side walls to lie along said side edges, and substantially flat legs extending from said wing portions to lie upon and along said spline and having near their ends latch portions that, when the clip is in place, protrude laterally from the spline and are engageable detachably with the claws of a said endmost set by being slid inside the same with said spline.

7. A blade refill unit according to claim 1, said detent means at each of a plurality of said locations comprising a pair of apertures formed in and spaced apart longitudinally of a central portion of said spline.

8. A blade refill unit according to claim 1, said spline end portion being formed with a said detent means at each of at least three said locations of which one is adjacent to the end of said spline end portion, said detent means at said one location comprising an indentation in a central portion of said spline and said detent means at each other of said locations comprising a pair of apertures formed in and spaced apart longitudinally of a central portion of said spline.

9. A blade refill unit according to claim 7 or 8, including as a said attaching clip means a resilient clip formed to be placed and to hold itself onto said spline at any selected one of a plurality of said locations, said clip comprising a base to overlie and having depending opposite side walls to straddle said spline, detents turned downward from said base to engage in a pair of said apertures, normally divergent resilient wing portions extending from said side walls to lie along opposite side edges of said spline, and substantially flat legs extending from said wing portions to lie upon and along said spline and having near their ends latch portions that, when the clip is in place, protrude laterally from the spline and are engageable detachably with the claws of a said endmost set by being slid inside the same with said spline.

10. A blade refill unit according to claim 8, including as said attaching clip means at said one location a first resilient clip having a base portion lying across the end of said spline end portion, said base portion having a footing portion interengaged with said indentation and having normally divergent resilient wing portions extending from its opposite ends along said spline edges, and substantially flat legs extending from said wing portions and lying upon and along said spline and having near their ends latch portions engageable detachably with an endmost set of the claws of the longest of said blade holders by being slid inside the same with said spline;

said refill unit further including, as said attaching clip means for any selected one of said other locations, a second resilient clip formed to be placed and to hold itself onto said spline at the selected location, said second clip comprising a base to overlie and having depending opposite side walls to straddle said spline, detents turned downward from said base to engage in a pair of said apertures, normally divergent resilient wing portions extending from said side walls to lie along opposite side edges of said spline, and substantially flat legs extending from said wing portions to lie upon and along said spline and having near their ends latch portions that, when the second clip is in place, protrude laterally from the spline and are engageable detachably with the claws of a said endmost set by being slid inside the same with said spline.

* * * * *